United States Patent
Kim (10) Patent No.: US 11,603,141 B2
(45) Date of Patent: Mar. 14, 2023

(54) REAR SIDE BODY STRUCTURE OF VEHICLE

(71) Applicants: HYUNDAI MOTOR COMPANY, Seoul (KR); KIA CORPORATION, Seoul (KR)

(72) Inventor: Hyung Tae Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/365,578

(22) Filed: Jul. 1, 2021

(65) Prior Publication Data

US 2022/0177047 A1    Jun. 9, 2022

(30) Foreign Application Priority Data

Dec. 7, 2020   (KR) .................. 10-2020-0169198

(51) Int. Cl.
*B62D 27/02*      (2006.01)
*B62D 25/02*      (2006.01)

(52) U.S. Cl.
CPC .......... *B62D 27/023* (2013.01); *B62D 25/02* (2013.01); *B62D 25/025* (2013.01)

(58) Field of Classification Search
CPC .... B62D 25/02; B62D 25/025; B62D 27/023; B62D 21/157

USPC ..... 296/209, 203.01, 203.04, 29, 30, 187.12
See application file for complete search history.

(56) References Cited

U.S. PATENT DOCUMENTS 10,710,639 B2 *  7/2020  Otoguro ................. B62D 25/04
10,745,061 B2 *  8/2020  Wada ..................... B62D 25/08

FOREIGN PATENT DOCUMENTS

CN    103534164 A   *  1/2014  ........... B62D 25/025
DE  102018132258 A1  *  6/2020  ............... B60K 1/04

* cited by examiner

*Primary Examiner* — Dennis H Pedder
(74) *Attorney, Agent, or Firm* — Lempia Summerfield Katz LLC (57) ABSTRACT

The rear side body structure includes: a side sill outer panel forming a lower part of a side surface of a vehicle body, extending along a front-to-rear longitudinal direction of a vehicle, and including a bonding surface part on a rear end part thereof; a quarter inner panel connected to the side sill outer panel and forming a rear side surface of the vehicle body located at a rear of a rear door; and a first reinforcing member coupled to the side sill outer panel and to the quarter inner panel, and configured to cover a coupling portion between the side sill outer panel and the quarter inner panel, wherein the bonding surface part protrudes rearward and is bonded to a surface of the quarter inner panel.

8 Claims, 7 Drawing Sheets

REAR SIDE BODY STRUCTURE OF VEHICLE

CROSS REFERENCE TO RELATED APPLICATION

The present application claims priority to and the benefit of Korean Patent Application No. 10-2020-0169198, filed on Dec. 7, 2020, the entire contents of which are incorporated herein by reference.

FIELD

The present disclosure relates to a rear side body structure of a vehicle.

BACKGROUND

The statements in this section merely provide background information related to the present disclosure and may not constitute prior art.

Generally, an upper part of a vehicle body includes a roof forming the top of a vehicle and at least one pillar supporting the roof and arranged along a front-to-rear longitudinal direction of the vehicle.

The at least one pillar normally includes: a front pillar (an A-pillar) arranged at the front of a vehicle; a rear pillar (a C-pillar) arranged at the rear of the vehicle; and a center pillar (a B-pillar) arranged between the front pillar and the rear pillar relative to the front-to-rear longitudinal direction of the vehicle.

In addition, doors of the vehicle are mounted to the side surface of a vehicle body between the front pillar and the center pillar and between the rear pillar and the center pillar so as to open and close opening parts of the side surface of the vehicle body.

In a vehicle, an under body forming the floor of a vehicle compartment may be composed of a front floor panel, a center floor panel, and a rear floor panel, and to respond to side and rear crashes, a side sill member is arranged along a front-to-rear longitudinal direction of the vehicle on each of the opposite end parts of the vehicle width direction of the front floor panel and the rear floor panel.

In addition, a panel of the outer panels of a vehicle body, which is mounted to the rear side surface of the vehicle body toward the rear of a rear door, is commonly referred to as a quarter panel. The quarter panel includes a quarter inner panel arranged at the inner side of the quarter panel and a quarter outer panel arranged at the outer side of the quarter panel.

In this case, each of a rear floor side member and a wheel-house inner panel is coupled to the opposite end parts of the vehicle width direction of the rear floor panel, and the quarter inner panel is coupled to the outer upper part of the wheel-house inner panel.

Furthermore, the quarter inner panel and the quarter outer panel located at the outer side thereof are coupled to each other with a space defined therebetween, and constitute the quarter panel.

Meanwhile, vehicle manufacturers typically conduct crash tests in the process of vehicle development. For example, after the North American Insurance Institute for Highway Safety (IIHS) conducts a side crash test of a vehicle, whether vehicle crash safety is high or low can be determined through the evaluation of the test result.

In addition, in the process of the vehicle development, vehicle manufacturers are developing and applying a structure strengthening a vehicle body to respond to the crash tests as well as to secure safety in case of a vehicle crash, and are designing the vehicle body in consideration of changed conditions even when the evaluation method of the crash tests is changed.

Recently, in consideration of various vehicle crash modes in a field, the evaluation method of the side crash test conducted by the North American IIHS is also scheduled to be changed. Compared to the existing IIHS crash test, a changed IIHS crash test has more enhanced side crash conditions such as the increased weight of a moving deformable barrier (MDB), the increased strength of MDB, the increased crash speed of a vehicle, and the decreased ground clearance of MDB.

Accordingly, to respond to the evaluation of a side crash test under the side crash condition that is enhanced more than the existing side crash condition, the development of a vehicle body structure which has increased strength is desired.

When the strengthened side crash condition of IIHS is applied to a conventional vehicle body structure, the conventional vehicle body structure has excessive deformation occurring in the vehicle body structure located at the lower end of the opening part for the rear door.

To describe more, in the existing IIHS side crash test, a side impact barrier (MDB) has a high ground clearance and the strength of the barrier is distributed in the entirety thereof compared to an enhanced IIHS crash test, so a door part of a vehicle is intensively deformed.

Accordingly, in the conventional vehicle body structure, to restrain the deformation of a part of a vehicle body located at the rear side of the opening part for the rear door, an impact beam located inside the door is located at a portion of the door to which a side impact load is applied with the door closed, and a structure increasing the amount of an overlapping portion between the impact beam and the vehicle body is normally applied.

In addition, to further increase the overlapping portion between the impact beam and the vehicle body when the impact beam of the door is moved and deformed toward the inner side of a vehicle during vehicle crash, the shape of the rear end part of a side sill outer panel is increased or a separate reinforcing member is installed thereinside.

However, such a structure is a partially reinforced structure in consideration of a transverse impact load alone, and thus is insufficient in longitudinal connectivity between the side sill outer panel and the quarter panel, so the efficiency of the frame of the vehicle body is reduced.

In addition, to restrain the deformation of the inner side of the rear side surface part of a vehicle body in consideration of the design and structural characteristics of a vehicle in case of excessive deformation of the vehicle body, the reinforcing member is installed on a panel of the vehicle body. However, we have discovered that in the conventional vehicle body structure, a vulnerable connection structure between the reinforcing member at the inner side of the vehicle body and the panel of the vehicle body is desired to be improved.

We have further discovered that, recently, due to the characteristics of door design, providing the reinforced structure of the side sill outer panel is limited, and when an enhanced side crash mode is applied to the conventional vehicle body structure, the deformation amount of each of the lower end of the rear door and a rear wheel arch portion may be significantly increased.

A moving deformable barrier (MDB) for the side crash used in the advanced IIHS side crash test is low in the ground clearance as described above, and the strength of the outer side of the body of the moving deformable barrier is increased more than that of the conventional moving deformable barrier for the side crash, so the moving deformable barrier used in the advanced side crash mode has aspects different from the moving deformable barrier used in an existing side crash mode.

SUMMARY

The present disclosure provides a vehicle body structure, which can reduce the weight of a vehicle body and secure cost competitiveness only by simple structural improvement and has increased strength to reduce the deformation of the vehicle body during a side crash.

Particularly, the present disclosure provides a rear side body structure of a vehicle, in which connection vulnerability between panels of the body structure can be compensated compared to a conventional vehicle body structure, and the deformation of the vehicle body is restrained in a side crash mode that is enhanced more than the existing side crash mode, so the rigidity of the vehicle body is increased and the body structure against a side crash is strengthened.

According to one form of the present disclosure, a rear side body structure of a vehicle, the body structure including: a side sill outer panel forming a lower part of a side surface of a vehicle body, extending along a front-to-rear longitudinal direction of the vehicle, and including a bonding surface part formed on a rear end part thereof; a quarter inner panel forming a rear side surface of the vehicle body located at a rear of a rear door and connected to the side sill outer panel; and a first reinforcing member coupled to the side sill outer panel and to the quarter inner panel, and configured to cover a coupling portion between the side sill outer panel and the quarter inner panel, wherein the bonding surface part protrudes rearward and is bonded to a surface of the quarter inner panel, whereby longitudinal connectivity between the two panels is secured.

Accordingly, according to the rear side body structure of a vehicle of the present disclosure, the weight of a vehicle body can be reduced, cost competitiveness can be secured only by simple structural improvement, and the deformation of the vehicle body during a side crash can be reduced.

In addition, according to the rear side body structure of a vehicle of the present disclosure, connection vulnerability between panels of the body structure can be compensated compared to a conventional vehicle body structure, and the deformation of the vehicle body structure is restrained in a side crash mode that is enhanced more than the existing side crash mode, thereby increasing the rigidity of the vehicle body and strengthening the body structure against a side crash.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Meanwhile, it will be understood that, although the terms "first", "second", etc. may be used herein to describe various elements, these elements should not be limited by these terms. These terms are only used to distinguish one element from another element. For instance, a first element discussed below could be termed a second element without departing from the concept of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

In the present specification, a singular form also includes a plural form unless specifically stated in a phrase. As used herein, "comprises" and/or "comprising" does not exclude the presence or addition of one or more other components, steps, actions and/or elements which are described.

Hereinbelow, various forms of the present disclosure will be described in detail with reference to the accompanying drawings.

The present disclosure relates to a rear side body structure of a vehicle. More particularly, the present disclosure relates to a vehicle body structure, which can reduce the weight of a vehicle body and secure cost competitiveness only by simple structural improvement and has increased strength to reduce the deformation of the vehicle body during a side crash.

In addition, the present disclosure provides the rear side body structure of a vehicle, in which connection vulnerability between parts of a vehicle body can be compensated compared to a conventional vehicle body structure, and the deformation of the vehicle body structure is restrained in a side crash mode that is enhanced more than the existing side crash mode, thereby increasing the rigidity of the vehicle body and strengthening the body structure against a side crash.

To this end, in the rear side body structure of a vehicle according to the present disclosure, a multi-way load path for a side impact load is provided and the distribution performance of the side impact load of a vehicle body is enhanced so as to promote the strengthening of the frame of the vehicle body and to increase the efficiency of the strengthening.

Particularly, in the rear side body structure of a vehicle according to the present disclosure, the structure of the multi-way load path for the side impact load in consideration of the connectivity of the body structure to an impact beam of a door is applied to the vehicle body structure of the lower part of a rear pillar (a C-pillar) having excessive deformation occurring during the side crash of a vehicle, whereby the impact load can be efficiently distributed and the crash-resistant performance and rigidity of the body frame are increased.

Figure 1:
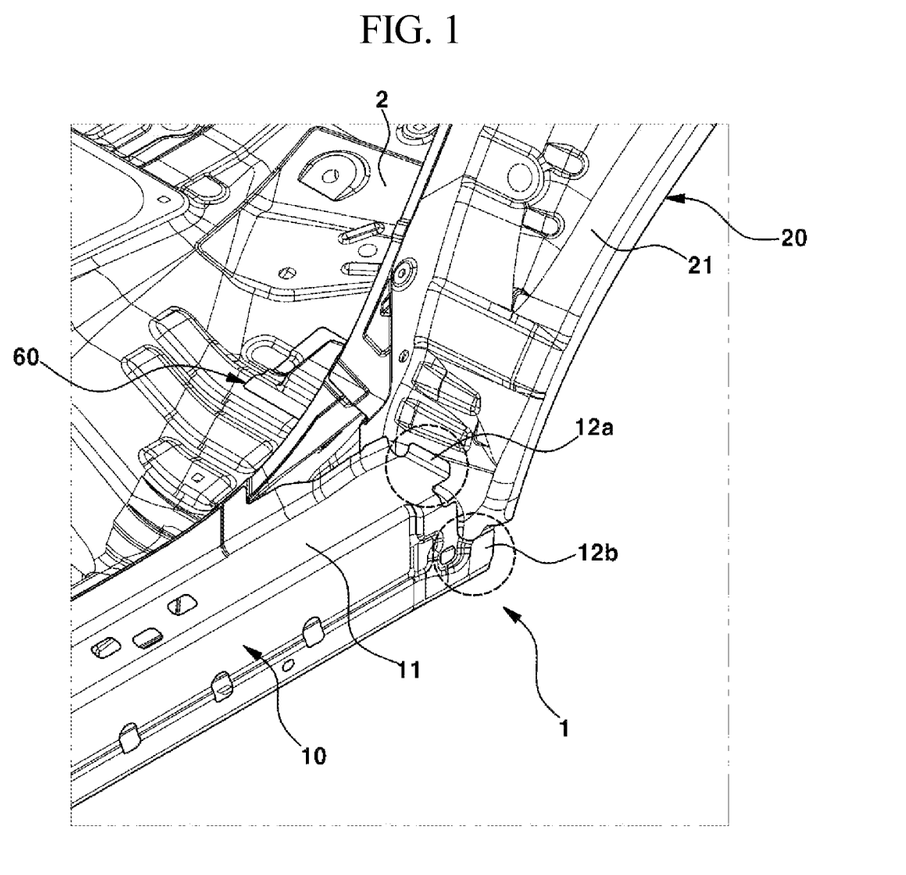
FIG. 1 is a perspective view illustrating a coupling portion between a side sill outer panel and a quarter inner panel in a rear side body structure of a vehicle according to one form of the present disclosure.

Hereinbelow, one form of the rear side body structure of a vehicle of the present disclosure will be described in detail with reference to the accompanying drawings. FIG. 1 is a perspective view illustrating a rear side body structure 1 of a vehicle according to one form of the present disclosure. FIG. 1 illustrates the coupled state of the rear end part of a side sill outer panel 11 and the lower end part of a quarter inner panel 21 to each other.

In the following description, an L direction means a front-to-rear longitudinal direction of the vehicle; a T direction means a side-to-side width direction thereof; and an H direction means a vertical direction thereof.

In addition, a T surface and a T surface contact mean a contact surface vertical to or approximately vertical to the front-to-rear longitudinal direction of the vehicle and contact thereof, respectively, on parts of the vehicle body, that is, on a panel and a reinforcing member to be described later. Furthermore, an L surface and an L surface contact mean a contact surface vertical to or approximately vertical to the side-to-side width direction of the vehicle and contact thereof, respectively, on the panel and the reinforcing member.

Additionally, an H surface and an H surface contact mean a contact surface perpendicular to or approximately perpendicular to the vertical direction of the vehicle and contact thereof, respectively, on the panel and the reinforcing member. Here, the contact surface means a surface in contact with and bonded to another panel or another member.

As illustrated in FIG. 1, in the rear side body structure 1 of a vehicle according to one of the present disclosure, the rear end part of the side sill outer panel 11 is bonded to and coupled to the lower end part of the quarter inner panel 21. In this case, the two panels 11, 21 may be fixed to each other by welding.

With the side sill outer panel 11 coupled to a side sill inner panel (not shown), the side sill outer panel 11 is a panel forming a side sill member 10. The side sill member 10 is a part of the vehicle body that has a closed cross-sectional shape of an outline set when the side sill outer panel 11 and the side sill inner panel are coupled to each other. The side sill member 10 is a part of the vehicle body forming the side lower part of the vehicle body, and is arranged to extend along the front-to-rear longitudinal direction of the vehicle.

In the vehicle body structure, a rear floor side member 50 and a wheel-house inner panel are coupled to the opposite side ends of a rear floor panel 2. The rear floor side member 50 is coupled to the rear end part of the side sill member 10. Furthermore, the quarter inner panel 21 is coupled to the outer upper part of the wheel-house inner panel.

In addition, a quarter outer panel which is not shown is coupled to the side sill outer panel 11 of the side sill member 10 and the outer side of the quarter inner panel 21, and an opening part to which a rear door is mounted is formed in the quarter outer panel. The rear door is mounted to the opening part to be opened and closed. In this case, the quarter outer panel and the outer panel of the rear door form the exterior of the rear side body of the vehicle.

As described above, the rear end part of the side sill outer panel 11 forming the side sill member 10 is coupled to the lower end part of the quarter inner panel 21. The quarter inner panel 21 is coupled to the quarter outer panel with a space defined therebetween toward the outside of the quarter inner panel 21.

Accordingly, a quarter panel 20 includes the quarter inner panel 21 arranged at an inner side thereof and the quarter outer panel arranged at an outer side thereof, and a first reinforcing member 30 to be described later is installed between the quarter inner panel 21 and the quarter outer panel.

Accordingly, the quarter panel 20 composed of the quarter inner panel 21 and the quarter outer panel forms the rear side surface part of the vehicle, together with the side sill member 10 composed of the side sill outer panel 11 and the side sill inner panel, the rear pillar, and the rear floor side member 50.

In addition, as illustrated in FIG. 1, in bonding the rear end part of the side sill outer panel 11 which is a high-strength panel member and the lower end part of the quarter inner panel 21 to each other, the side sill outer panel 11 has a plurality of protruding bonding surface parts 12a and 12b formed at a part corresponding to a predetermined width of the end of the rear end part thereof by extending to have protruding shapes in the longitudinal directions of the side sill outer panel 11.

Accordingly, the plurality of the protruding bonding surface parts 12a and 12b formed to have protruding shapes on the rear end part of the side sill outer panel 11 include a first bonding surface part 12a having a T surface shape in a T surface contact with the upper surface of the lower end part of the quarter inner panel 21, and a second bonding surface part 12b having an L surface shape in an L surface contact with the side surface of the lower end part of the quarter inner panel 21.

That is, the T surface and L surface of the bonding surface parts 12a and 12b formed on the end portion of the rear end part of the side sill outer panel 11 have shapes and structures capable of being bonded to the surface of the quarter inner panel 21 to be in the T surface contact and L surface contact, respectively, with the surface of the quarter inner panel 21. Accordingly, in the present disclosure, longitudinal connectivity between the side sill outer panel 11 and the quarter inner panel 21 can be secured, and the longitudinal connectivity can be improved, compared to the conventional vehicle body structure.

Figure 2:
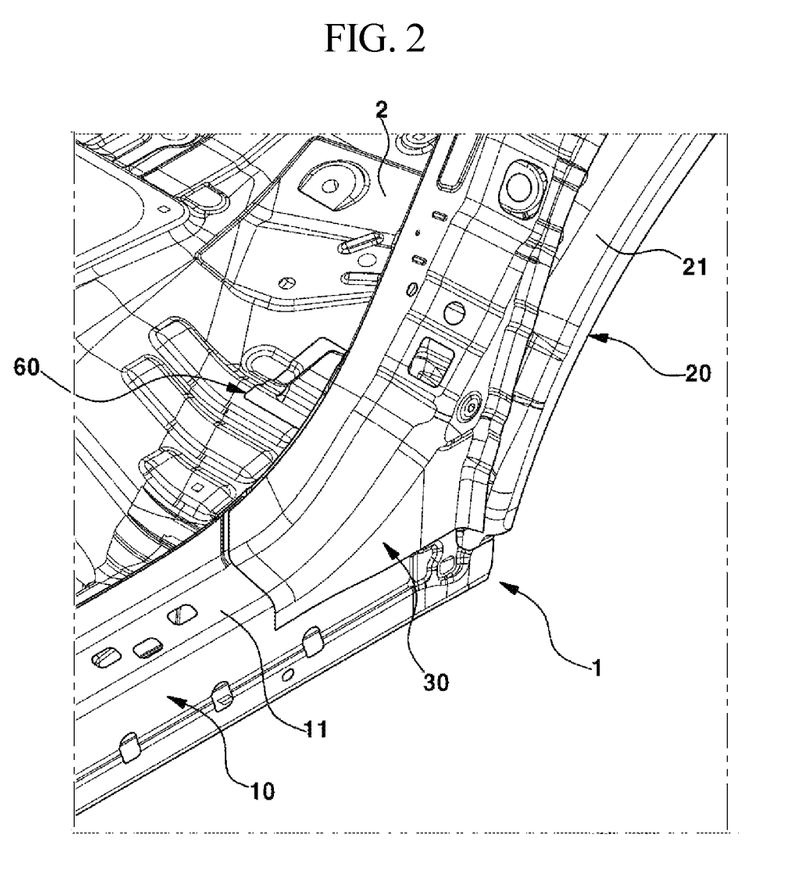
FIG. 2 a perspective view illustrating the installed state of a first reinforcing member in the rear side body structure of a vehicle according to one form of the present disclosure.

FIG. 2 illustrates the installed state of the first reinforcing member 30 on the rear end part of the side sill outer panel 11 and on the lower end part of the quarter inner panel 21 in the rear side body structure 1 of a vehicle according to one form of the present disclosure.

As illustrated in the drawing, with the side sill outer panel 11 and the quarter inner panel 21 coupled to each other, the first reinforcing member 30 is coupled to the surfaces of the two panels. In this case, the first reinforcing member 30 is arranged to cover the rear end part of the side sill outer panel 11 and the lower end part of the quarter inner panel 21 from above and is fixed thereto by a bonding method such as welding.

Accordingly, the first reinforcing member 30 is installed on a coupling portion between the side sill outer panel 11 and the quarter inner panel 21, so the longitudinal connectivity between the side sill outer panel 11 and the quarter inner panel 21, which are the parts of the vehicle body, can be increased, and transverse connectivity between the parts of the vehicle body including the first reinforcing member 30 can also be increased, and further, the deformations of the lower part of the rear pillar (the C-pillar) and a wheel arch portion can be effectively restrained.

Figure 3:
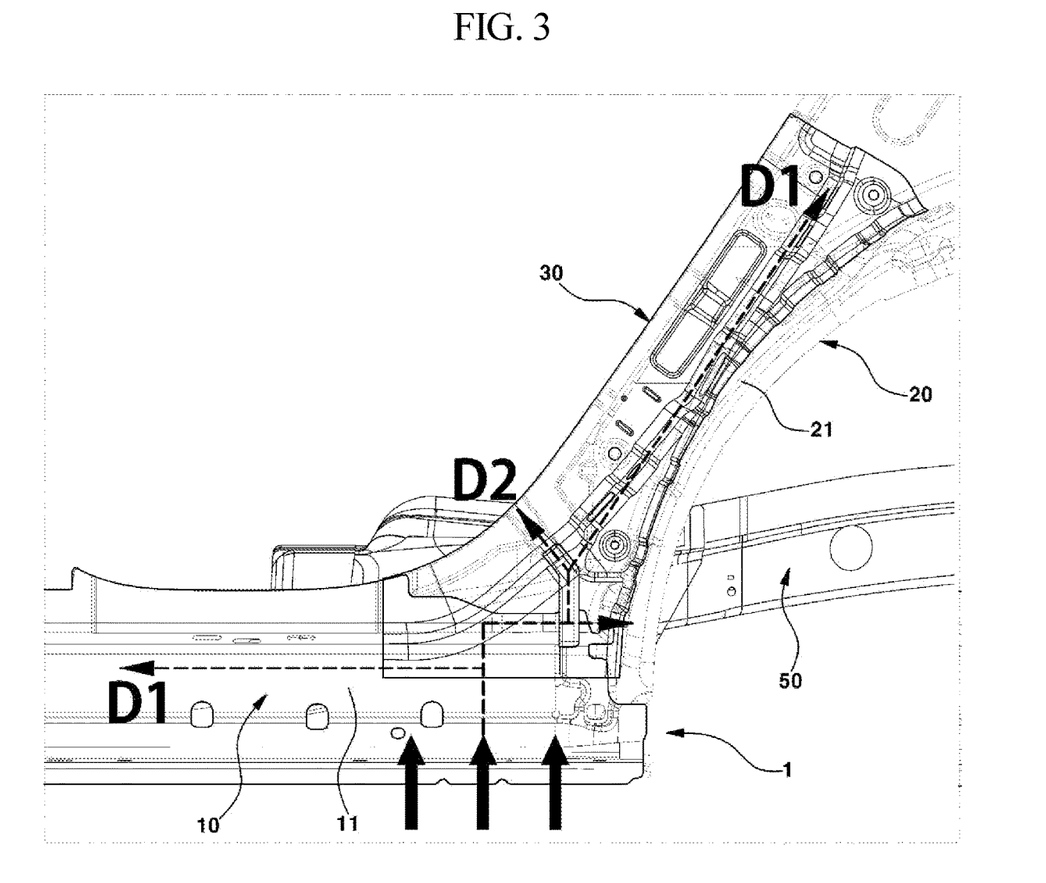
FIG. 3 is a side view illustrating an important configuration of the rear side body structure of a vehicle according to one form of the present disclosure.

FIG. 3 is a side view of the rear side body structure 1 of a vehicle according to one form of the present disclosure. FIG. 3 illustrates that the connectivities of longitudinal direction D1 and transverse direction D2 between the side sill outer panel 11 and the quarter inner panel 21 can be reinforced by installing the first reinforcing member 30 on the side sill outer panel 11 and on the quarter inner panel 21.

As illustrated in the drawing, the first reinforcing member 30 is coupled to the coupling portion between the rear end part of the side sill outer panel 11 and the lower end part of the quarter inner panel 21, so the connectivities of the longitudinal direction D1 and the transverse direction D2, which are directions of arrows between these parts of the vehicle body, can be improved.

Figure 4:
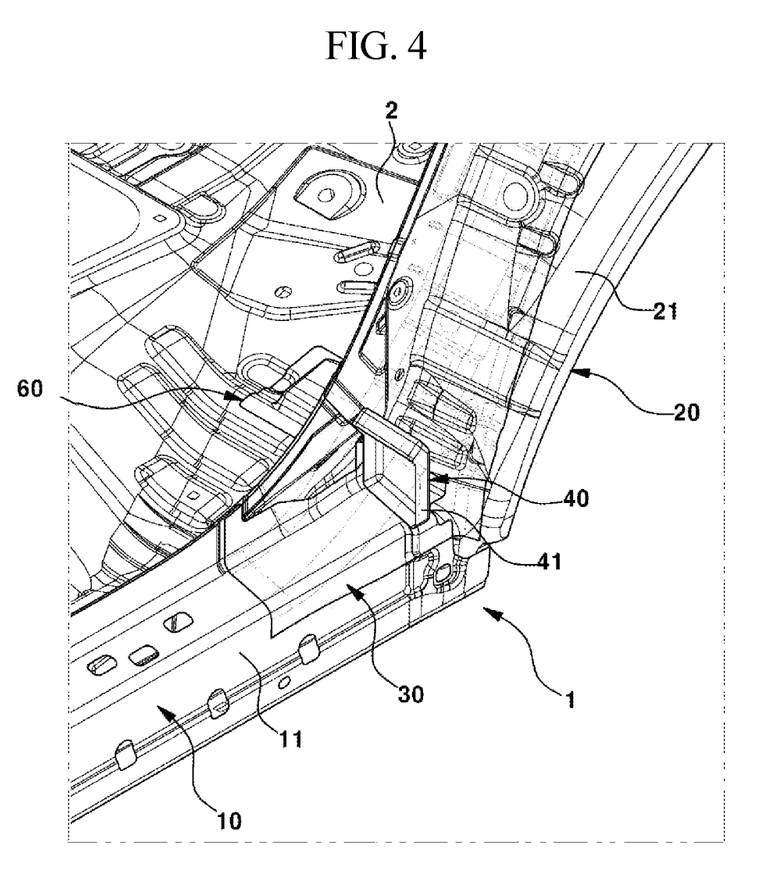
FIG. 4 is a perspective view illustrating the installed state of a second reinforcing member in the rear side body structure of a vehicle according to one form of the present disclosure.

Meanwhile, FIG. 4 is a perspective view illustrating an important configuration of the rear side body structure 1 of a vehicle according to one form of the present disclosure, and illustrates the state of a second reinforcing member 40 installed between the lower end part of the quarter inner panel 21 and the first reinforcing member 30. In FIG. 4, to show the installed state of the second reinforcing member 40 located inside the first reinforcing member, the surface of the first reinforcing member 30 is illustrated to be transparent, and only the outer shape of first reinforcing member 30 is illustrated with a solid line.

In one form of the present disclosure, the first reinforcing member 30 is installed to be spaced apart by predetermined space from the coupling portion between the side sill outer panel 11 and the quarter inner panel 21. Accordingly, an empty space exists in an inside between the coupling portion between the two panels 11, 21 and the first reinforcing member 30. In such a structure, the second reinforcing member 40 is installed in the empty inner space between the two panels 11, 21 and the first reinforcing member 30.

The second reinforcing member 40 may be a plate-shaped member. In this case, a second reinforcing member bonding surface part 41 may be formed along the perimeter of the second reinforcing member 40, the bonding surface part being bonded to each of the surfaces of the two panels 11, 21 and the first reinforcing member 30.

In this case, the second reinforcing member 40 may be a rectangular-shaped plate member as a whole. In the second reinforcing member 40, the second reinforcing member bonding surface part 41 has a shape bending at a rectangular plate thereof to be bonded to the surfaces of the side sill outer panel 11, the quarter inner panel 21, and the first reinforcing member 30, which are located at positions adjacent to the second reinforcing member bonding surface part 41.

In this case, when the second reinforcing member 40 is located in the space defined by the side sill outer panel 11, the quarter inner panel 21, and the first reinforcing member 30, the second reinforcing member bonding surface part 41 which forms the perimeter of the second reinforcing member 40 is welded to the surfaces of the two panels 11, 21 and the first reinforcing member 30, so the second reinforcing member 40 is fixed in the space between the panels 11, 21 and the first reinforcing member 30.

Figure 5:
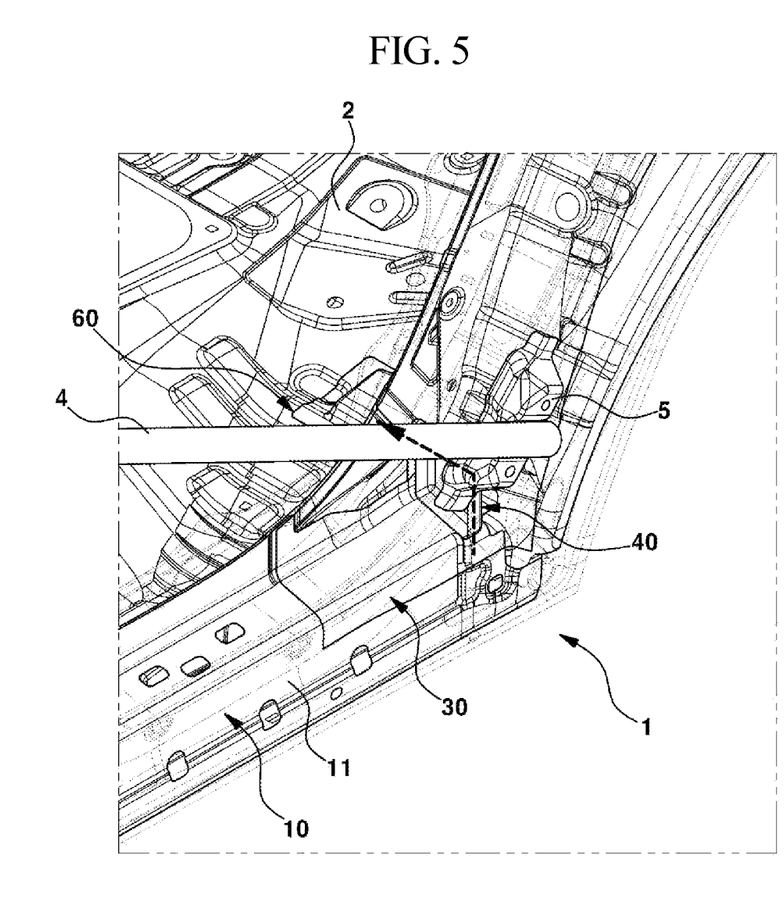
FIG. 5 is a perspective view illustrating the rear side body structure of a vehicle and an impact beam located inside a door according to one form of the present disclosure.

FIG. 5 is a perspective view illustrating the rear side body structure 1 of a vehicle and the impact beam 4 located inside the door according to one form of the present disclosure, and illustrates the position of the impact beam 4 installed inside the door when the door (a reference numeral 3 of FIG. 7) is closed. In FIG. 5, the door is illustrated to be transparent such that the impact beam 4 and a beam support bracket 5 installed inside the door can be seen in the drawing.

In a normal vehicle, a door has a configuration in which a door inner panel and a door outer panel are coupled to each other. In the door having such a configuration, the impact beam 4 is installed in the inner space of the door between the door inner panel and the door outer panel. In this case, the impact beam 4 may be installed on a part to which an impact load is applied during the side crash of a vehicle, and each of the opposite end parts of the impact beam 4 may be coupled to and fixed to the door inner panel by the beam support bracket 5.

In one form of the present disclosure, the second reinforcing member 40 described above and a third reinforcing member 60 to be described later are located at the same phase positions as the beam support bracket 5 of the inner side of the position of the beam support bracket 5 supporting the impact beam 4 inside the door.

That is, when a side impact load is applied to the impact beam 4 located inside the door through the door outer panel during a side crash of a vehicle, the load transmitted to the impact beam 4 is applied to the door inner panel through the beam support bracket 5 located on each of the opposite end parts of the impact beam 4. In this case, the second reinforcing member 40 is arranged at the immediate inner side of the beam support bracket 5 in a lateral direction of the vehicle (in an indoor side direction) and at the same phase position as the beam support bracket 5.

For reference, in the following description, that another component is arranged at an immediate inner side of one component in the lateral direction and at the same phase position as the one component may mean that the two components located at the inner and outer sides of the inside of the vehicle body structure, respectively, are arranged to at least partially overlap with each other.

Referring to FIG. 5, the beam support bracket 5 and the second reinforcing member 40 are arranged to at least partially overlap with each other while being located at an outside and an inside, respectively.

Accordingly, connectivity between the second reinforcing member 40 of the vehicle body structure and the impact beam 4 of the door can be enhanced, and the amount of the overlapping of the vehicle body structure 1 and the impact beam 4 with each other for a transverse load (the side impact load) occurring during a side crash can be increased. The impact load transmitted to the beam support bracket 5 is transmitted to the second reinforcing member 40 and the third reinforcing member 60 installed to be located in the lateral directions at the immediate inner sides of the beam support bracket 5 and at the same phase positions as the beam support bracket 5. In this case, the second reinforcing member 40 and the third reinforcing member 60 located at the immediate inner sides of the beam support bracket 5 and at the same phase positions as the beam support bracket 5 support the impact load transmitted by the beam support bracket 5.

As indicated by a dotted arrow in FIG. 5, the transverse load is transmitted through the second reinforcing member 40, whereby the multi-way load path in which the transverse load is distributed and transmitted to various paths can be increased (see FIG. 7), and resistance to a transverse impact load can be secured and increased.

Figure 6:
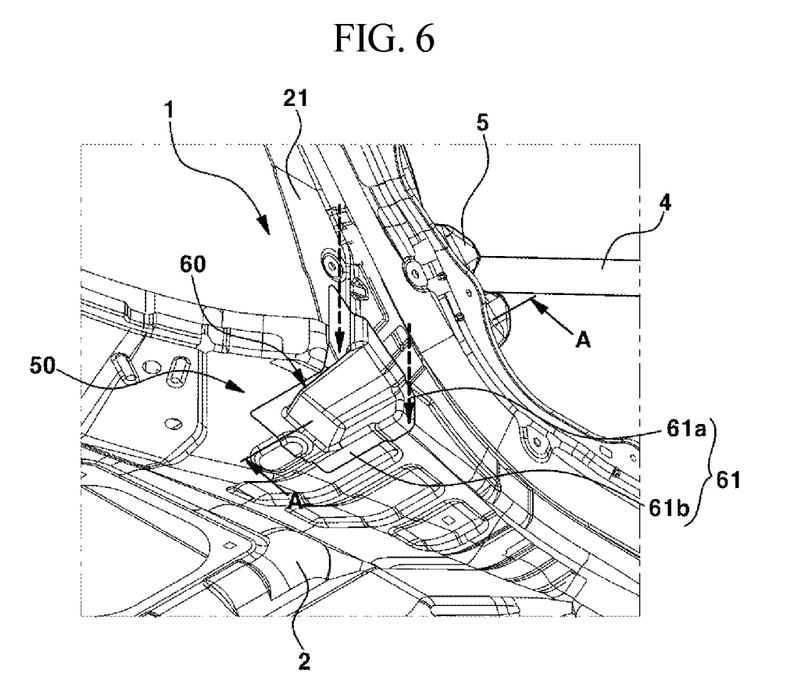
FIG. 6 is a perspective view illustrating the state of a third reinforcing member installed on the inner side of a vehicle body in the rear side body structure of a vehicle according to one form of the present disclosure.

FIG. 6 is a perspective view illustrating the important parts of the rear side body structure 1 inside the vehicle body according to one form of the present disclosure. FIG. 6 illustrates the installed state of the third reinforcing member 60, which is a plate-shaped member at the inner side of the vehicle body of the vehicle body structure 1.

As illustrated in the drawing, the third reinforcing member 60 is installed at the inner side of the vehicle body structure 1. Particularly, in one form of the present disclosure, at the inner side of the vehicle body structure 1, together with the second reinforcing member 40, the third reinforcing member 60 is arranged to be located at the same phase position as the beam support bracket 5 of the immediate inner side of the beam support bracket 5 of the inner side of the door.

In this case, the third reinforcing member 60 is provided to have a third reinforcing member bonding surface part 61 formed on a perimeter thereof. The third reinforcing member bonding surface part 61 which is the perimeter of the third reinforcing member 60 includes a third bonding surface part 61a formed to have an L surface shape and a fourth bonding surface part 61b formed to have an H surface shape.

The third bonding surface part 61a of the third reinforcing member bonding surface part 61 of the third reinforcing member 60 is bonded and fixed to the inner surface of the quarter inner panel 21 (a rigid body) forming the side surface of the vehicle body structure 1. Furthermore, in the third reinforcing member 60, the fourth bonding surface part 61b of the third reinforcing member bonding surface part 61 is bonded and fixed to the upper surface of the rear floor side member 50 which is a rigid body.

Accordingly, the third reinforcing member 60 is connected to the quarter inner panel 21 and the rear floor side member 50 of the vehicle body structure 1, which is a rigid body, and distributes the transverse load applied to the vehicle body structure 1 during the side crash of a vehicle to each portion of the vehicle body structure 1.

Finally, in the vehicle body structure 1 according to one form of the present disclosure, the second reinforcing member 40 and the third reinforcing member 60 are installed to be connected to a plurality of predetermined portions of the vehicle body structure, so the distribution of the transverse load applied to the vehicle body structure during the side crash of a vehicle can be further enhanced.

In addition, for the transverse load occurring during a side crash, the amount of the overlapping of the vehicle body structure 1 and the impact beam 4 with each other can be increased, and as indicated by dotted arrows in FIG. 6, the multi-way load path for the transverse load can be increased.

As described above, the first reinforcing member 30, the second reinforcing member 40, and the third reinforcing member 60 are located at the immediate inner side of the beam support bracket 5, so during a side crash, the distribution performance of the transverse load transmitted through the beam support bracket 5 can be enhanced.

Figure 7:
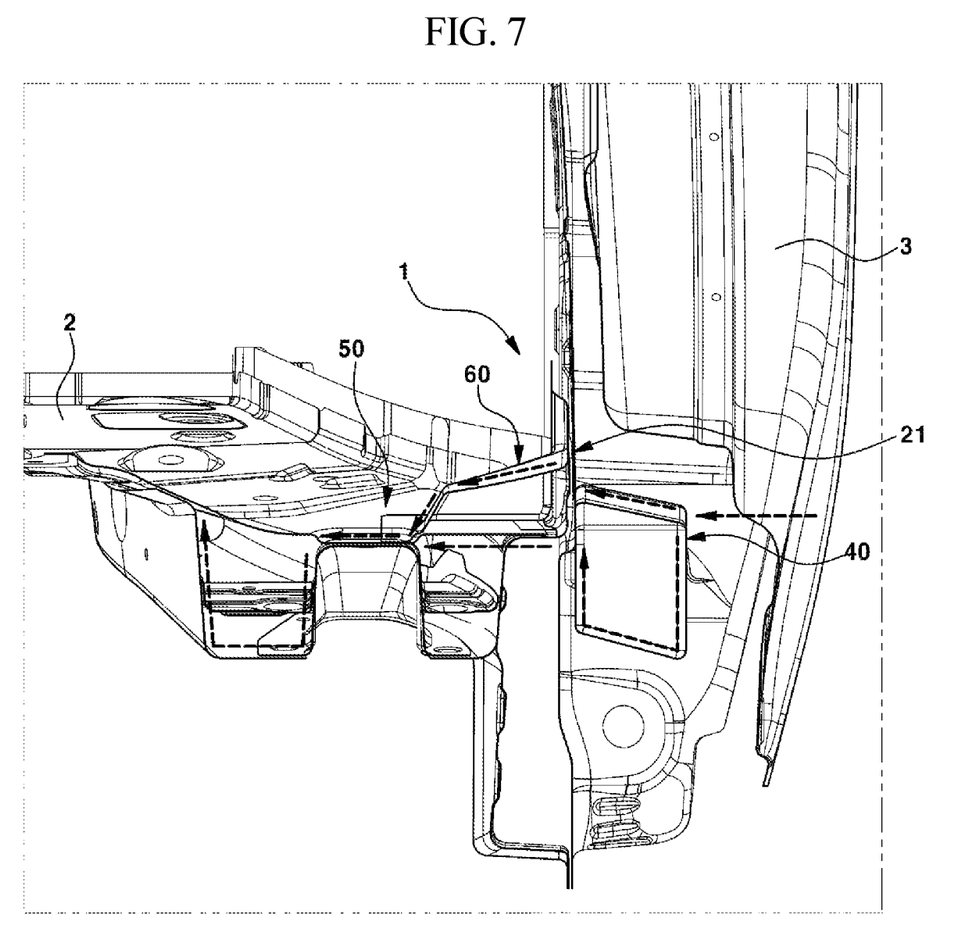
FIG. 7 is a sectional view taken along line A-A of FIG. 6.

FIG. 7 is a sectional view taken along line A-A of FIG. 6, and illustrates that a strong connection structure between the panels of the vehicle body and the reinforcing member, and the multi-way load path for the side impact load are provided. Dotted arrows indicate the transmission path of the transverse load applied to the vehicle body structure during a side crash in the sections of the vehicle body structure 1 according to one form of the present disclosure.

Referring to FIG. 7, the second reinforcing member 40 and the third reinforcing member 60 are arranged to at least partially overlap with each other while being located at an outside and an inside, respectively.

Accordingly, in the vehicle body structure 1 according to one form of the present disclosure, as indicated by the dotted arrows in FIG. 7, the multi-way load path, which is the multi-way path through which the side impact load is transmitted, is formed in the sections of the vehicle body structure, so the distribution of the transverse load can be diversified.

In addition, as described above, in the vehicle body structure according to one form of the present disclosure, due to the enhancement of connectivity between the parts of the vehicle body, the rigidity of the frame of the vehicle body, particularly, the rigidity thereof against torsion and bending can be improved.

Although various forms of the present disclosure has been described for illustrative purposes, claims of the present disclosure are not limited to only the forms set forth herein, and those skilled in the art will appreciate that various modifications, additions and substitutions are possible, without departing from the scope and spirit of the present disclosure.

What is claimed is:

1. A rear side body structure of a vehicle, the rear side body structure comprising:
   a side sill outer panel forming a lower part of a side surface of a vehicle body, extending along a front-to-rear longitudinal direction of the vehicle, and including a bonding surface part on a rear end part thereof;
   a quarter inner panel connected to the side sill outer panel and forming a rear side surface of the vehicle body located at a rear of a rear door;
   a first reinforcing member coupled to the side sill outer panel and to the quarter inner panel, and configured to cover a coupling portion between the side sill outer panel and the quarter inner panel; and
   a second reinforcing member positioned in a space defined between the rear end part of the side sill outer panel, a lower end part of the quarter inner panel, and the first reinforcing member,
   wherein the bonding surface part protrudes rearward and is bonded to a surface of the quarter inner panel,
   wherein the second reinforcing member includes a second reinforcing member bonding surface part formed along a perimeter of the second reinforcing member, and the second reinforcing member bonding surface part is fixedly bonded to a surface of the side sill outer panel, the surface of the quarter inner panel, and a surface of the first reinforcing member.

2. The rear side body structure of claim 1, wherein the bonding surface part comprises:
   a first bonding surface part contacting an upper surface of a lower end part of the quarter inner panel; and
   a second bonding surface part contacting a side surface of the lower end part of the quarter inner panel.

3. The rear side body structure of claim 1, further comprising a third reinforcing member positioned at an inner side of the rear side body structure.

4. The rear side body structure of claim 3, wherein the third reinforcing member includes a third reinforcing member bonding surface part formed along a perimeter of the third reinforcing member,
- wherein the third reinforcing member bonding surface part is bonded to a surface of a vehicle body panel that is located at an inner side of the vehicle body, and comprises:
- a third bonding surface part connected to an inner side of the quarter inner panel; and
- a fourth bonding surface part fixedly bonded to a rear floor side member that is installed on each side end part of opposite side end parts of a rear floor panel of the vehicle body.

5. The rear side body structure of claim 3, wherein the second reinforcing member is located at an inner side of a beam support bracket that is supporting an end part of an impact beam of the rear door.

6. The rear side body structure of claim 5, wherein the second reinforcing member and the beam support bracket are arranged to at least partially overlap with each other.

7. The rear side body structure of claim 5, wherein the third reinforcing member is located at an inner side of the second reinforcing member.

8. The rear side body structure of claim 7, wherein the second reinforcing member and the third reinforcing member are configured to at least partially overlap with each other.

\* \* \* \* \*